United States Patent Office 2,855,291
Patented Oct. 7, 1958

2,855,291

SLAG CONDITIONING AGENT

Felix B. Litton, Devon, Pa., assignor to Foote Mineral Company, Berwyn, Pa., a corporation of Pennsylvania No Drawing. Application August 28, 1956
Serial No. 606,541

20 Claims. (Cl. 75—54)

This invention relates to a novel slag conditioning agent, and more particularly, to an improved conditioning agent for basic furnace slags in the manufacture of steel. This invention also contemplates an improved process for conditioning a basic furnace slag in the manufacture of steel involving the employment of a novel slag conditioning agent.

Because of the relatively high phosphorous and sulfur content of iron ore and steel scrap, most of the steel, approximately 88%, produced in the United States is processed in basic open-hearth furnaces which permit the removal of these impurities from the steel. As is well known, in the basic open-hearth process, pig iron and steel scrap are converted into steel ingots. The raw materials consumed in the basic open-hearth process are generally liquid or solid pig iron, steel scrap, limestone, burnt lime, and iron ore. The process is flexible in that the furnace may be charged with various combinations and proportions of these raw materials, and produce a quality product to a specified analysis.

The procedure for charging a basic open-hearth furnace is normally as follows: The charging cycle starts after tapping the previous heat. A charging machine, as quickly as possible, places the solid portions of the charge in the furnace. Limestone is charged first into the bottom of the furnace; iron ore is then charged on top of the limestone, and steel scrap is then charged on top of the iron ore. A period referred to as the "melting period" begins when the steel scrap is charged into the furnace. During the melting period, the burners are adjusted to give a short, intense flame and are fired with excess air. This type flame tends to melt the scrap quickly, and keep the furnace from being chilled. When the scrap is nearly entirely melted, molten pig iron is charged into the furnace.

A portion of the process referred to by steel manufacturers as the "refining period" begins upon the addition of molten pig iron. The purification of iron in the furnace during the refining period is commonly spoken of by those skilled in steel-making as taking place in three separate stages: the "ore boil," the "lime boil," and the "working period." During the ore boil, which derives its name from the fact that carbon is the pig iron during this period is oxidized to carbon monoxide and is evolved through the slag, impurities in the pig iron are oxidized in addition to carbon, and enter the slag. As the ore is consumed, and the ore boil subsides, the temperature of the bath rises, and calcination of the limestone commences. The evolution of carbon dioxide during calcination of the limestone is characteristically a vigorous reaction and is referred to as the lime boil. As the limestone is calcined, it rises through the slag and replaces iron and manganese oxides in the slag. The excess lime is taken into the solution in the slag, making the slag more basic and thus capable of taking more oxide impurities into solution. The carbon dioxide bubbling through the bath is also a source of oxygen, and it oxidizes some carbon to carbon monoxide.

The end of the lime boil marks the beginning of the working period. During the working period, substantially complete removal of silicon, manganese, phosphorous and sulfur, and removal of carbon to the desired level is obtained by means of the basic slag and through oxidation. The sources of oxygen during the working period are the furnace atmosphere and feed ore. As lime goes into solution, the slag becomes thicker having a higher viscosity. This shaping up of the slag enhances the transfer of oxygen to the molten metal bath by means of the slag. Feed ore is also added to the bath in carefully measured amounts to promote carbon removal at a controlled rate.

The lumps of lime as they pass upwardly through the slag during the process, often become coated with the slag. Because of the affinity of lime for silica, a coating of dicalcium silicate is formed around the lumps of lime floating in the slag. Because of its properties, dicalcium silicate seals off further solution of the lime thus encased. The reason for this appears to be that dicalcium silicate has a melting point which is roughly several hundred degrees higher than the operating temperature employed in open-hearth furnace practice. As lime is consumed during the process, and the lime floating in the slag, called "floaters", fails to go into solution because of the coating of dicalcium silicate surrounding the pieces of lime, some means other than by high temperature alone are necessary to dissolve the lime and get it into solution in the slag to increase the fluidity of the slag so that it will properly refine the steel.

In the past, solution of lime has been accomplished by the addition of fluorspar ($CaF_2$), which because of its lower melting point, the law of eutectics and its other properties, speeds up the fluxing and fluidizing of the lime. Although fluorspar is an effective slag conditioning agent, unfortunately it is a relatively costly material. In addition, natural deposits of fluorspar are limited in number and size, thus, this fluxing material is often extremely hard to obtain, particularly during periods of high steel demand, as for example during a war. Also, fluorspar varies in grade according to silica content. The "effective" grade of fluorspar is said to be equal to the content of calcium fluoride, minus two and one-half times the silica content of the fluorspar. Because of this relationship of the effective calcium fluoride content to silica content, it can be seen that relatively small variations in the quantity of silica present radically alter the effective calcium fluoride content of the fluorspar. Such changes in the grade of fluorspar, obviously are undesirable and difficult to compensate for in shaping up of a slag to obtain the desired steel product.

Because fluorspar is expensive and ofttimes difficult to obtain, and because the grade thereof may vary widely, a number of attempts have been made to prepare a slag conditioning agent which would be a substitute for fluorspar. However, little success, if any, has been found in such endeavor. A suitable basic furnace slag conditioning agent in the manufacture of steel should have certain properties. First of all, such an agent should have a melting point sufficiently low to insure rapid melting of the agent at furnace temperatures. The slag conditioning agent should increase the fluidity (decrease the viscosity) of the slag without the necessity of increasing the furnace temperature. The agent should also increase the chemical activity of the slag, particularly with respect to the ability of the slag to remove phosphorus and sulfur. This increase in fluidity and chemical activity of the slag should take place in as short a period of time as possible. The conditioning agent should also have the ability to "cut" any dicalcium silicate coating on lumps of lime floating on the surface of the slag so as to cause these lime "floaters" to go into solution as quickly as possible.

The slag conditioning agent should also be relatively inexpensive and preferably be of a predetermined composition.

Among the suggested fluorspar substitutes are calcium ferrite, iron oxide, sodium carbonate, calcium aluminate, strontianite, high iron bauxite, aluminum metal dross, ilmenite, rock salt and calcium alumino ferrite. However, none of these materials have proven to be a satisfactory substitute for fluorspar. These materials have a number of shortcomings. For example, mono- and dicalcium ferrite, although they dissolve lime "floaters" they fail to thin a slag to the desired consistency. Thus, the slag does not perform its required refining during the working period. Calcium aluminate has also been found to fail to increase the fluidity of a slag to any appreciable extent. Iron oxide, for example ferric oxide or iron ore, generally fails to thin up a slag in the necessary relatively short period of time. In addition, the iron oxide or ore may make the bath too oxidizing and also too acid, and thus interfere with removal of impurities such as sulfur and phosphorous, which requires a strongly basic slag. Sodium oxide, which may be introduced to the bath in the form of sodium carbonate, in the generally large quantities necessary to cause the proper fluxing of the slag, may also cause fluxing of the refractory brick in the basic open-hearth furnace.

A primary object of this invention is to provide an improved basic furnace slag conditioning agent in the manufacture of steel.

Another object of this invention is the provision of an improved process for conditioning a basic slag in the basic open-hearth process for the manufacture of steel.

A further object of this invention is the provision of a slag conditioning agent which increases the fluidity and chemical activity of a basic open-hearth slag in a relatively short period of time.

A still further object of the present invention is to provide a slag conditioning agent which rapidly causes the solution of lime "floaters" in a basic open-hearth slag.

Still another object of this invention is the provision of a basic furnace slag conditioning agent which is an inexpensive and readily available substitute for fluorspar.

Yet another object of this invention is the provision of a process for conditioning a basic open-hearth furnace slag by the addition of a novel slag conditioning agent thereto.

These and other objects of this invention will become readily apparent from a consideration of this specification and claims.

According to this invention there is provided a basic furnace slag conditioning agent providing on being heated to an elevated temperature a composition consisting esstntially of an alkali metal oxide, an alkaline earth metal oxide, an iron oxide, and a halogen selected from the group consisting of fluorine and chlorine. According to one embodiment of the invention, there is provided a basic furnace slag conditioning agent consisting essentially of an alkali metal compound selected from the group consisting of an alkali metal oxide and an alkali metal compound decomposable to form an alkali metal oxide upon being heated to an elevated temperature; an alkaline earth metal compound selected from the group consisting of an alkaline earth metal oxide and an alkaline earth metal compound decomposable to form an alkaline earth metal oxide upon being heated to an elevated temperature, an iron compound selected from the group consisting of an iron oxide and an iron compound decomposable to form an iron oxide upon being heated to an elevated temperature, and a halide selected from the group consisting of alkali metal and alkaline earth metal fluorides and chlorides. The process of this invention is directed to conditioning a basic furnace slag in the manufacture of steel by the basic open-hearth process, and comprises, during the working period, adding to the slag, in an amount sufficient to increase the fluidity of said slag, a slag conditioning agent of the type defined above, and more fully described hereinafter.

According to this invention, it was found that a certain synthetic composition provides an excellent substitute for fluorspar as a basic slag conditioning agent in the manufacture of steel by the basic open-hearth process. The materials for forming this slag conditioning agent are relatively inexpensive and are generally available in quantity. Thus, a shortage thereof is unlikely even during times of peak steel production, as for example during wartime. Because the slag conditioning agent is a synthetic composition, rather than a raw material, such as fluorspar, which is used as a slag conditioning agent in substantially the same form in which it is found in mineral deposits, it is of a predetermined composition which can be readily duplicated and need not vary as to the proportion of constituents or in quality unless so desired. Thus, the steel producer is assured of a slag conditioning agent of known fluxing power and high quality. This synthetic slag conditioning agent has been found in the actual manufacture of steel on a commercial scale to substantially increase the fluidity and chemical activity of a basic open-hearth slag and to cause the solution of lime "floaters" by rapidly attacking deposits of dicalcium silicate formed on the surface of the floating lime particles. It was also found that the net result from employing the improved basic furnace slag conditioning agent of this invention is substantially reduced process times in the production of steel by the basic open-hearth process.

As stated previously, the novel basic furnace slag conditioning agent of this invention provides on being heated to an elevated temperature a composition consisting essentially of an alkali metal oxide, an alkaline earth metal oxide, an iron oxide and a halide selected from the group consisting of fluorine and chlorine. Generally, the alkali metal oxide, such as $Na_2O$, $K_2O$ or $Li_2O$, will be present in such composition at said elevated temperature in an amount of from about 2% to about 5%, by weight, of said composition, the alkaline earth metal oxide, such as CaO, BaO, and SrO, in an amount of from about 20% to about 50%, iron oxide such as $Fe_2O_3$, $Fe_3O_4$, FeO, and mixtures thereof in an amount of from about 30% to about 70% expressed as $Fe_2O_3$, and halogen, such as fluorine and chlorine, in an amount from about 4% to about 13%. Preferably, the slag conditioning agent provides on being heated to an elevated temperature a composition consisting essentially of about 3%, by weight, of an alkali metal oxide, about 31% of an alkaline earth metal oxide, about 59% of an iron oxide expressed as $Fe_2O_3$, and about 7% of a halogen selected from the group consisting of fluorine and chlorine.

It was found that the basic furnace slag conditioning agent of this invention increases the fluidity and chemical activity of a basic open-hearth furnace slag and dissolves lime "floaters" therein in a relatively short period of time whether the conditioning agent is in the form of a mixture of materials providing on being heated to an elevated temperature a composition having the chemical analysis set forth in the preceding paragraph; a sintered mixture of such materials, or a frit having the previously stated chemical analysis. Thus, the basic furnace slag conditioning agent may consist of a mixture of materials which provide on being heated to an elevated temperature a composition consisting essentially of a mixture of alkali and alkaline earth metal and iron oxides and chlorine or fluorine. This mixture of materials providing this chemical analysis upon being heated to an elevated temperature, may be in the form of a sintered mixture, i. e., a substantially dry intermolecular combination of the constituent materials. The slag conditioning agent may also be in the form of a frit composed of the aforementioned metal oxides and halogen. According to a preferred embodiment of the invention, the slag conditioning agent is in the form of an agglomerated mixture or tablet consisting essentially of alkali metal, alkaline earth metal and iron oxides and/or alkali metal, alkaline earth metal, and iron compounds decomposable at elevated temperatures to form the corresponding oxides, and an alkali and/or alkaline earth metal fluoride or chloride.

By the expression "elevated temperature" as used in this specification and claims with reference to the chemical composition of the slag conditioning agent and compounds decomposable to form oxides is meant from about that temperature at which the agent undergoes fusing to about the upper range of temperatures generally employed in an open-hearth furnace during the working period in the manufacture of steel. The slag conditioning agent of this invention has a fusing temperature of about 2000° F., although the substitution of one constituent for another, as for example SrO for CaO, or $K_2O$ for $Na_2O$ may increase or decrease the fusing temperature of the agent as much as from about 50° to 200° F. Open-hearth furnace temperatures during the working period may run as high as about 3300° F., but generally are in the range between about 2400° and 3000° F. Thus, the slag conditioning agent should consist essentially of the aforementioned mixture of alkali metal, alkaline earth metal and iron oxides and halogen within the discussed temperature range. Likewise, compounds decomposable to form oxides, such as alkali metal compounds, within the scope of this invention, are those which are in the form of an oxide within this temperature range.

In that embodiment of the invention wherein the slag conditioning agent consists essentially of alkali metal, alkaline earth metal and iron oxides and/or alkali metal, alkaline earth metal and iron compounds decomposable to form the corresponding oxide on being heated to an elevated temperature, and an alkali metal and/or alkaline earth metal fluoride or chloride, a large number of different chemical compounds may be employed. For example, if the alkali metal is sodium, it may be present in the form of the oxide, $Na_2O$, or it may be present as a sodium carbonate, such as soda ash or sodium carbonate monohydrate, or other sodium compound decomposable at elevated temperatures to form the oxide, such as sodium nitrate and the like. Similarly, if the alkali metal is potassium or lithium, suitable alkali metal compounds are the oxides, such as $K_2O$ or $Li_2O$, and compounds decomposable to oxides such as the carbonates, nitrates, etc., of the latter-mentioned alkali metals. Suitable alkaline earth metal compounds, for example calcium compounds, are calcium oxide, CaO, burnt lime, quicklime, hydrated lime, and calcium carbonate. Other alkaline earth metal compounds may be employed, such as the oxides of strontium and barium, and other compounds of these alkaline earth metals such as the carbonates, nitrates, hydroxides, and the like. The iron compound may be an oxide such as FeO, $Fe_2O_3$, $Fe_3O_4$ and mixtures thereof, or an iron ore such as hematite or magnetite. Other iron compounds decomposable to oxides such as the carbonate and nitrate of iron may also be used.

The alkali and alkaline earth metal chlorides or fluorides may be, for example sodium or calcium fluoride or the corresponding chlorides. These alkali and alkaline earth metal fluorides and chlorides may also be in the form of less pure materials such as rock salt, fluorspar, lepidolite, sodium silicofluoride, topaz, crylolite, and the like.

The various alkali metal, alkaline earth metal and iron oxides and/or alkali metal, alkaline earth metal and iron compounds decomposable to the corresponding oxides, and alkali metal and/or alkaline earth metal fluorides or chlorides preferably should be present in such proportions as to provide a slag conditioning agent which on being heated to an elevated temperature provides a composition consisting essentially of from about 2% to about 5%, by weight, of an alkali metal oxide, from about 20% to about 50% of an alkaline earth metal oxide, from about 30% to 70% of an iron oxide expressed as $Fe_2O_3$, and from about 4% to about 13% of fluorine and/or chlorine. A particularly effective slag conditioning agent composition consists essentially of from about 3.5% to about 6.5%, by weight, of sodium carbonate, from about 25% to about 45% of calcium carbonate, from about 26% to about 64% of $Fe_2O_3$, and from about 7.5% to about 22.5% of calcium fluoride. A preferred slag conditioning agent consists essentially of about 4.5%, by weight, of sodium carbonate, about 33% of calcium carbonate, about 50% $Fe_2O_3$, and about 12.5% of calcium fluoride.

The aforementioned preferred composition consisting of sodium carbonate, calcium carbonate, $Fe_2O_3$ and calcium fluoride, and slag conditioning agent compositions of this type may be in the form of a mixture of finely-divided particles, the particle size of the individual components being generally less than about 10 mesh, and preferably less than about 60 mesh, U. S. Bureau of Standards. The components of the agent in particulate form may be agglomerated to form a tablet, or the like, by mixing the constituents with a suitable binding agent such as water and sodium silicate or other binding agents which do not adversely affect the desirable properties of the agent. The term "consisting essentially," as employed in the claims of this application, is thus not intended to exclude minor amounts of a material intentionally added to the agent, such as a binder, which does not adversely affect the advantageous properties of the slag conditioning agent to any significant degree. During the mixing operation, in which a liquid medium, such as water may be employed, nodules are formed and are separated from the mixer. These nodules of agent are employed to condition a basic slag. Tableting machines may, of course, be employed.

In certain instances, it may be desirable to have the slag conditioning agent in the form of a sintered mass. In such case, a mixture of compounds, which upon being heated to an elevated temperature produces a composition consisting of metal oxides and halogen, such as the oxides themselves or compounds decomposable to form oxides is heated to a temperature of from about 1450° to about 1850° F. to cause sintering of the mixture, i. e. a substantially dry intermolecular combination of the chemical constituents of the slag conditioning agent.

As stated previously, the slag conditioning agent of this invention has a fusing temperature of about 2000° F., and substitution of one alkali or alkaline earth metal compound, iron compound or halide for another does not appreciably alter the fusing point of the agent. In Table I, below, are set forth suitable slag conditioning compositions within the scope of this invention. These compositions are obtained by substituting the compound listed in the table for the respective alkali metal, alkaline earth metal compound or halide in a slag conditioning agent of the following composition: 4.5% $Na_2CO_3$, 33% $CaCO_3$, 50% $Fe_2O_3$ and 12.5% $CaF_2$, which has a fusing temperature of about 2000° F.

TABLE I

| Substitute Compound | Fusing Temperature of Composition, °F |
|---|---|
| $Li_2CO_3$ | 1,990 |
| $K_2CO_3$ | 2,080 |
| NaCl | 2,000 |
| $BaCO_3$ | 2,280 |
| $SrCO_3$ | 2,240 |

Since the fusing temperature of the conditioning agent of this invention is substantially below basic open-hearth furnace temperatures employed during the working period, the slag conditioning agent is readily fluidized by the hot slag and rapidly increases the fluidity and chemical activity of the slag.

As previously stated the slag conditioning agent may be in the form of a frit consisting essentially of an alkali metal oxide, an alkaline earth metal oxide, iron oxide and fluorine or chlorine. As is well known, in preparing a frit, compounds ultimately providing the desired chemical analysis, in the present case, providing the desired oxide and halide analysis, are mixed together in fine particle size and then melted. If the resulting frit is to have a relatively fine particle size, the molten mass is rapidly cooled, as for example by water-quenching. Of course, if briquettes, tablets or the like, of the stated frit composition are desired, the fine particles of frit may be agglomerated or the molten frit may be poured into suitable molds wherein it cools and solidifies. Those compounds which may be employed to provide a suitable frit composition are the alkali metal oxides, alkaline earth metal oxides and iron oxides and/or alkali metal, alkaline earth metal and iron compounds decomposable to the respective oxides at elevated temperatures, and the alkali and/or alkaline earth metal fluorides and chlorides heretofore mentioned as being suitable for combination as such to form the slag conditioning agent of this invention. The fusing temperature of a frit composition of this invention is roughly similar to the fusing temperature of the mixture of chemical compounds providing the frit.

The slag conditioning agent, whether in the form of a mixture of compounds providing the above-described composition of metal oxides and halogen on being heated to an elevated temperature, which mixture may be a sintered mass, or in the form of a frit, is preferably added to a basic open-hearth furnace slag in the form of a tablet weighing from about .05 to 5 grams, and preferably from about .1 to .5 gram. The use of substantially larger tablets tends to chill the furnace bath in the area wherein they are deposited, which cooling of the slag has an undesirable effect on the steel making process. Tablets or agglomerates of the aforementioned size, however, are easy to handle, rapidly melt in the slag at ordinary open-hearth furnace temperatures, and do not cool the bath to any significant degree.

The basic slag conditioning agent of this invention is added to the slag of a basic open-hearth furnace employed in the manufacture of steel during that portion of the refining part of the process commonly referred to by steel makers as the "working period" and described in detail heretofore in this application. The amount of slag conditioning agent added should be sufficient to increase the fluidity of the slag to the particular degree desired, and also to dissolve lime "floaters." The manufacture of steel by the basic open-hearth process is, to a large extent, empirical, but the amount of slag conditioning agent required depends upon the particular heat being processed in the furnace. Slags of different composition are used to produce steels of different chemical analysis. The quantity of slag conditioning agent which may be necessary to thin or increase the fluidity of one slag to the desired degree may not produce the desired fluidity with a slag of a different composition. It is not possible, therefore, to set forth with any reasonable accuracy those amounts of conditioning agents which should be added to a basic open-hearth slag in order to provide it with a proper fluidity. Generally, about four pounds of conditioning agent is required for each ton of steel processed. Persons skilled in the art of producing steel by the basic open-hearth processes are familiar with the problem of thinning the slag and they have been found to have no difficulty in thinning basic slags to the desired degree with the novel slag conditioning agent of this invention.

The preparation of the composition of the present invention and the advantages to be obtained by the use may be readily understood from a consideration of the following specific examples which are given for the purpose of illustration only, and are not intended to limit the scope of the invention in any way.

Example I

The following materials, all of which have a particle size of less than 10 mesh, are mixed together in the amounts indicated:

| Constituent: | Parts by weight |
|---|---|
| Sodium carbonate | 4.5 |
| Calcium carbonate | 33 |
| Magnetite ($Fe_3O_4$) | 50 |
| Calcium fluoride | 12.5 |

These materials are thoroughly mixed in a fiber clay crucible and the mixture is melted in a gas-fired pot furnace. At furnace temperature of about 2000° F., the mass completely melts down to a fluid. This takes about 30 to 40 minutes. The molten mass is then water-quenched, and the resulting frit is dried. The frit has the following chemical analysis: $Na_2O$ 3%; CaO 31%; $Fe_2O_3$ 59%; F 7%, by weight.

Example II

The fluxing properties of fluorspar and the slag conditioning agent of this invention consisting of 4.5%, by weight, of $Na_2CO_3$; 33% $CaCO_3$; 50% $Fe_2O_3$, and 12.5% $CaF_2$ are determined in the following manner. Various amounts of the fluorspar and slag conditioning agents are mixed in solid form with a solid slag having the following composition:

| | Weight percent |
|---|---|
| CaO | 45 |
| MgO | 10 |
| FeO | 10 |
| MnO | 5 |
| $Al_2O_3$ | 5 |
| $P_2O_5$ | 3 |
| $SiO_2$ | 22 |

The mixture is heated in a crucible and the melting temperature of the slag is recorded. The results of these tests are set forth in Table II.

TABLE II

| Material | Weight Percent of Mixture | Slag Melting Point, °F. |
|---|---|---|
| $CaF_2$ | 5 | 2,160 |
| $CaF_2$ | 10 | 2,140 |
| $CaF_2$ | 15 | 2,110 |
| 75% $CaF_2$—25% $SiO_2$ | 5 | 2,200 |
| 75% $CaF_2$—25% $SiO_2$ | 10 | 2,170 |
| 75% $CaF_2$—25% $SiO_2$ | 15 | 2,140 |
| 50% $CaF_2$—50% $SiO_2$ | 5 | 2,220 |
| 50% $CaF_2$—50% $SiO_2$ | 10 | 2,200 |
| 50% $CaF_2$—50% $SiO_2$ | 15 | 2,160 |
| Conditioning Agent | 5 | 2,285 |
| Conditioning Agent | 10 | 2,260 |
| Conditioning Agent | 15 | 2,230 |

According to the results set forth in Table II, the slag conditioning agent of this invention compares favorably with commercial grades of fluorspar which contain approximately 60% effective fluorspar.

Example III 120 lbs. of a slag conditioning agent consisting of 4.5% $Na_2CO_3$; 33% $CaCO_3$; 50% $Fe_2O_3$; and 12.5% $CaF_2$ are added to a high lime slag of a 100 ton open-hearth furnace during the working period. Prior to the addition of the agent, the slag is creamy and thick. After addition of the slag conditioning agent, the slag "opens up" or becomes fluid.

Example IV

A slag conditioning agent consisting of 4.5% $Na_2CO_3$, 33% $CaCO_3$, 50% $Fe_2O_3$ and 12.5% $CaF_2$ is added to the slag of a 200 ton open-hearth furnace during the "working period." The operating record for the furnace is as follows:

| Time, a. m. | Remarks |
| --- | --- |
| 8:40 | Metal having 1.30% carbon is melted. |
| 8:45 | 1,200 lbs. of lime and 2,500 lbs. of ore are added to furnace. |
| 9:00 | 2,500 lbs. of ore are added to the furnace. |
| 9:20 | Carbon in metal 0.86%. |
| 9:30 | 2,500 lbs. of ore are added. |
| 9:40 | 900 lbs. of lime are added to the furnace. |
| 10:00 | Carbon in metal 0.48%. |
| 10:05 | 900 lbs. of lime and 2,500 lbs. of ore are added to furnace. |
| 10:21 | Slag contains 18% FeO. |
| 10:26 | 900 lbs. of lime are added to thicken the slag. |
| 10:30 | 100 lbs. of slag conditioning agent are added. This agent dissolves readily and thins the slag. |
| 10:34 | 900 lbs. of lime are added to thicken the slag. |
| 10:38 | 100 lbs. of slag conditioning agent are added. This material dissolves readily and thins the slag. |
| 10:50 | Carbon in steel 0.06%; sulfur 0.042%; manganese 0.17%. |
| 11:30 | Metal is tapped from the furnace. |

Although throughout this specification the composition of the slag conditioning agent at temperatures employed during the working period in the basic open-hearth process for the manufacture of steel has been indicated as being a mixture of individual alkali metal and alkaline earth metal oxides, iron oxide and halogen, the exact chemical form of the agent is not known. It is believed that the metal oxides and halogen may form a complex. Thus, the representation of the chemical structure of the agent at these elevated temperatures as a mixture of the individual metal oxides and halogen is merely for the purpose of convenience and greater clarity of discussion, and the claims of this application are not intended to be restricted to merely a mixture of the individual metal oxides and halogen, which of course they include.

I claim:

1. A basic furnace slag conditioning agent providing on being heated to an elevated temperature a composition consisting essentially of from about 2% to about 5%, by weight, of an alkali metal oxide, from about 20% to about 50% of an alkaline earth metal oxide, from about 30% to about 70% of an iron oxide expressed as $Fe_2O_3$, and from about 4% to about 13% of a halogen selected from the group consisting of fluorine and chlorine.

2. The product of claim 1 in which said alkali metal oxide is $Na_2O$.

3. The product of claim 1 in which said alkaline earth metal oxide is CaO.

4. The product of claim 1 in which said halogen is fluorine.

5. A basic furnace slag conditioning agent providing on being heated to an elevated temperature a composition consisting essentially of about 3% of $Na_2O$, about 31% CaO, about 59% $Fe_2O_3$, and about 7% fluorine.

6. A basic furnace slag conditioning agent consisting essentially of an intimate mixture of an alkali metal oxide source selected from the group consisting of an alkali metal oxide and an alkali metal compound decomposable to form an alkali metal oxide upon being heated to an elevated temperature, the amount of said alkali metal oxide source being selected to provide from about 2 to about 5 percent, by weight, of an alkali metal oxide at an elevated temperature, an alkaline earth metal oxide source selected from the group consisting of an alkaline earth metal oxide and an alkaline earth metal compound decomposable to form an alkaline earth metal oxide upon being heated to an elevated temperature, the amount of said alkaline earth metal oxide source being selected to provide from about 20 to about 50 percent of an alkaline earth metal oxide at an elevated temperature, an iron oxide source selected from the group consisting of an iron oxide and an iron compound decomposable to form an iron oxide upon being heated to an elevated temperature, the amount of said iron oxide source being selected to provide from about 30 to about 70 percent of iron oxide, expressed as $Fe_2O_3$, at an elevated temperature, and a halogen source selected from the group consisting of alkali metal and alkaline earth metal fluorides and chlorides, the amount of said halogen source being selected to provide from about 4 to about 13 percent of a halogen at an elevated temperature.

7. The product of claim 6 in which said alkali metal compound is sodium carbonate.

8. The product of claim 6 in which said alkaline earth metal compound is calcium carbonate.

9. The product of claim 6 in which said halide is calcium fluoride.

10. A basic furnace slag conditioning agent consisting essentially of an intimate mixture of from about 3.5% to about 6.5%, by weight, of sodium carbonate, from about 25% to about 45% of calcium carbonate, from about 26% to about 64% of $Fe_2O_3$, and from about 7.5% to about 22.5% of calcium fluoride.

11. The product of claim 10 in which said agent is in the form of a tablet weighing from about .05 to about 5 grams.

12. A basic furnace slag conditioning agent consisting essentially of about 4.5%, by weight, of sodium carbonate, about 33% of calcium carbonate, about 50% of $Fe_2O_3$, and about 12.5% of calcium fluoride.

13. The product of claim 12 in which said agent is in the form of a tablet weighing from about 0.05 to about 5 grams.

14. The product of claim 12 in which said agent is in the form of a tablet weighing from about 0.1 to about 0.5 gram.

15. A basic furnace slag conditioning agent consisting essentially of an intimate mixture of about 4.5% sodium carbonate, about 33% calcium carbonate, about 50% $Fe_2O_3$, and about 12.5% calcium fluoride bound together by means of a sodium silicate binder.

16. A process for conditioning a basic furnace slag in the manufacture of steel by the basic open-hearth process which comprises, during the working period, adding to the slag in an amount sufficient to increase the fluidity of said slag, a slag conditioning agent providing on being heated to an elevated temperature, a composition consisting essentially of from about 2% to about 5%, by weight, of an alkali metal oxide, from about 20% to about 50% of an alkaline earth metal oxide, from about 30% to about 70% of an iron oxide expressed as $Fe_2O_3$, and from about 4% to about 13% of a halogen selected from the group consisting of fluorine and chlorine.

17. A process for conditioning a basic furnace slag in the manufacture of steel by the basic open-hearth process which comprises, during the working period, adding to the slag in an amount sufficient to increase the fluidity of said slag, a slag conditioning agent consisting essentially of an intimate mixture of an alkali metal oxide source selected from the group consisting of an alkali metal oxide and an alkali metal compound decomposable to form alkali metal oxide upon being heated to an elevated temperature, the amount of said alkali metal oxide source being selected to provide from about 2 to about 5 percent, by weight, of an alkali metal oxide at an elevated temperature, an alkaline earth metal oxide source selected from the group consisting of an alkaline earth metal oxide and an alkaline earth metal compound decomposable to form an alkaline earth metal oxide upon being heated to an elevated temperature, the amount of said alkaline earth metal oxide source being selected to provide from about 20 to about 50 percent of an alkaline earth metal oxide at an elevated temperature, an iron oxide source selected from the group consisting of iron oxide and an iron compound decomposable to form an iron oxide upon being heated to an elevated temperature, the amount of said iron oxide source being selected to provide from about 30 to about 70 percent of iron oxide, expressed as $Fe_2O_3$, at an elevated temperature, and a halogen source selected from the group consisting of alkali metal and alkaline earth metal fluoride and chlorides, the amount of said halogen source being selected to provide from about 4 to about 13 percent of a halogen at an elevated temperature.

18. The process of claim 17 in which slag conditioning agent consists essentially of from about 3.5% to about 6.5%, by weight, of sodium carbonate, from about 25% to about 45% of calcium carbonate, from about 20% to about 65% of iron oxide expressed as $Fe_2O_3$, and from about 7.5% to about 22.5% of calcium fluoride.

19. The process of claim 17 in which said slag conditioning agent consists essentially of about 4.5% of sodium carbonate, about 33% calcium carbonate, about 50% $Fe_2O_3$, about 12.5% of calcium fluoride.

20. The process of claim 19 in which said agent is in the form of a tablet weighing from about .05 to about 5 grams.

References Cited in the file of this patent

UNITED STATES PATENTS

| | | |
|---|---|---|
| 170,420 | Warner | Nov. 23, 1875 |
| 1,597,000 | Saklatwalla | Aug. 24, 1926 |
| 1,826,882 | Hennig | Oct. 13, 1931 |
| 2,146,926 | Andrews | Feb. 14, 1939 |
| 2,220,385 | Abbot et al. | Nov. 5, 1940 |
| 2,597,851 | Bowden | May 27, 1952 |